United States Patent [19]

Marcus et al.

[11] Patent Number: 5,057,152

[45] Date of Patent: Oct. 15, 1991

[54] SURFACE CLEANER/POLISH COMPOSITIONS AND A PROCESS FOR THE PREPARATION THEREOF

[75] Inventors: Bonita K. Marcus, Rye, N.Y.; Anthony J. Gioffre, Ridgefield, Conn.; Marianne Elliott, Elmsford, N.Y.

[73] Assignee: UOP, Des Plaines, Ill.

[21] Appl. No.: 66,062

[22] Filed: Jun. 24, 1987

[51] Int. Cl.$^5$ ............................................. C09B 1/02
[52] U.S. Cl. ........................................ 106/3; 106/11; 51/306; 51/308
[58] Field of Search ................ 106/3, 11; 51/308, 306

[56] References Cited

U.S. PATENT DOCUMENTS 4,243,545  1/1981  Campbell et al. ................... 252/103

FOREIGN PATENT DOCUMENTS 726668   1/1966  Canada ................................ 134/3
0107354  5/1984  European Pat. Off. .
20074    2/1981  Japan .

OTHER PUBLICATIONS

Derwent Abstract Accession No. 82-00031E/01, British Patent No. 2,082,454, Mar. 10, 1982.
Derwent Abstract Accession No. 86-002083/01, Hungarian Patent No. T035714, Jul. 29, 1982.
U.S. patent application Ser. No. 931,971 filed Nov. 24, 1986.

*Primary Examiner*—Amelia Burgess-Yarbrough
*Attorney, Agent, or Firm*—Thomas K. McBride; Richard G. Miller

[57] ABSTRACT

This invention relates to surface cleaner/polish compositions comprising (i) a volatile liquid carrier selected from water, a monohydroxy alcohol having from 1 to 5 carbon atoms and mixtures thereof, and (ii) a crystalline aluminosilicate selected from Zeolite A, Zeolite X, Zeolite, Y, Zeolite P and mixtures thereof as an abrasive material, wherein said crystalline aluminosilicate has a particle size distribution sufficient to (a) provide enhanced wettability properties, (b) provide enhanced dispersion stability, (c) provide enhanced anti-fogging properties, (d) reduce or eliminate residual filming, and/or (e) reduce or eliminate dust during surface removal. This invention also relates to a process for preparation of the surface cleaner/polish compositions.

3 Claims, No Drawings

SURFACE CLEANER/POLISH COMPOSITIONS AND A PROCESS FOR THE PREPARATION THEREOF

BRIEF SUMMARY OF THE INVENTION

1. Technical Field

This invention relates to cleaning/polishing formulations containing specific crystalline aluminosilicates as abrasive materials which have a specific particle size distribution, and also to a process for the preparation thereof.

2. Background of the Invention

A wide variety of cleaning formulations is known in the art. In general, such cleaning formulations are usually liquid-based suspensions of abrasive materials such as aluminum silicates, diatomaceous earths, amorphous silica, chalk and the like. Some cleaning formulations also contain waxes in addition to abrasives, thereby combining a cleaning and polishing action with the application of a protective coating to a surface.

Traditionally, the formulation of cleaning compositions has been more or less static with respect to the ingredients which are routinely added to provide the final cleaning composition. Certain well known components are considered to be routine additives to such cleaning compositions including abrasives, waxes, thickeners, stabilizers and the like. The inclusion of one or more of these components has generally been considered to be merely one of formulation for its intended purpose.

The use of crystalline aluminosilicates as abrasive materials in cleaning compositions is known in the art. For example, commonly assigned European Patent Application 010734, published May 2, 1984, describes polish compositions containing specific crystalline aluminosilicates as abrasive materials and silicon-derived compounds wherein the amount of silicon-derived compound employed in the polish composition can be substantially reduced with respect to the amount required when employed with other conventional abrasives to provide a polish composition having acceptable gloss and uniformity. This reduction in the amount of silicon-derived compound is effected by employinq as the abrasive component of the polish composition a crystalline aluminosilicate selected from Zeolite A, Zeolite X, Zeolite Y and mixtures thereof. The selection of the crystalline aluminosilicate is correlated to the selection of the silicon-derived compound such that the effective amount of the silicon derived compound is the minimum effective amount required and is less than the amount required when conventional abrasives are employed, e.g., a diatomite or a kaolin, as the abrasive material in said polish composition, while the gloss and uniformity provided by the polish composition are maintained. However, nowhere does this publication disclose, exemplify or recognize the unexpected advantages provided by the instant invention by utilizing specific crystalline aluminosilicates as abrasive materials having specific particle size distributions.

Cleaning formulations which do not contain abrasives are also known in the art. Commonly assigned Canadian Patent 726,668 describes cleaning formulations containing a finely-divided dilatant clay in a volatile liquid vehicle selected from water, a monohydroxy alcohol having from 1 to 5 carbon atoms and mixtures thereof. Anti-caking agents can be utilized in the cleaning formulations to decrease the caking tendency of the dilatant clay suspension during prolonged periods of storage. Suitable anti-caking agents include crystalline alkali metal aluminum silicates among others. As described at page 1, lines 14–15 of the Canadian patent, the disclosed cleaning compositions do not contain abrasives.

The instant invention is distinguished from the cleaning compositions of the prior art by utilizing specific crystalline aluminosilicates as abrasive materials which have specific particle size distributions sufficient to (a) provide enhanced wettability properties, (b) provide enhanced dispersion stability, (c) provide enhanced anti fogging properties, (d) reduce or eliminate residual filming, and/or (e) reduce or eliminate dust during surface removal.

DISCLOSURE OF THE INVENTION

This invention relates to surface cleaner/polish compositions comprising (i) a volatile liquid carrier selected from water, a monohydroxy alcohol having from 1 to 5 carbon atoms and mixtures thereof and (ii) a crystalline aluminosilicate selected from Zeolite A, Zeolite X, Zeolite Y, Zeolite P and mixtures thereof as an abrasive material, wherein said crystalline aluminosilicate has a particle size distribution sufficient to (a) provide enhanced wettability properties, (b) provide enhanced dispersion stability, (c) provide enhanced anti-fogging properties, (d) reduce or eliminate residual filming, and/or (e) reduce or eliminate dust during surface removal. This invention also relates to a process for preparation of the surface cleaner/polish compositions.

DETAILED DESCRIPTION

As indicated above, this invention relates to surface cleaner/polish compositions comprising (i) a volatile liquid carrier selected from water, a monohydroxy alcohol having from 1 to 5 carbon atoms and mixtures thereof, and (ii) a crystalline aluminosilicate selected from Zeolite A, Zeolite X, Zeolite Y, Zeolite P and mixtures thereof as an abrasive material, wherein said crystalline aluminosilicate has a particle size distribution sufficient to (a) provide enhanced wettability properties, (b) provide enhanced dispersion stability, (c) provide enhanced anti-fogging properties, (d) reduce or eliminate residual filming, and/or (e) reduce or eliminate dust during surface removal. This invention also relates to a process for preparation of the surface cleaner/polish compositions.

The volatile liquid carriers contemplated by this invention include water, monohydroxy alcohols having from 1 to 5 carbon atoms, petroleum distillates (mineral spirits) and mixtures thereof. These carriers are conventional materials known in the art. Preferred monohydroxy alcohols include isopropanol, methanol and ethanol. The volatile liquid carriers can be employed in an amount of from about 50 weight percent or less to about 95 weight percent or greater based on the total weight of the composition. Preferably, a relatively fast drying liquid carrier containing a mixture of water, a monohydroxy alcohol (isopropanol) and a petroleum distillate (mineral spirits) is employed in respective amounts of from about 7% weight percent to about 80 weight percent, from about 5 weight percent to about 15 weight percent and from about 1 weight percent to about 10 weight percent.

The crystalline aluminosilicate abrasive materials contemplated by this invention include Zeolite A, Zeolite X, Zeolite Y, Zeolite P (also known as Zeolite B) and mixtures thereof which have specific particle size distributions. In particular, the crystalline aluminosilicates have a particle size distribution sufficient to (a) provide enhanced wettability properties, (b) provide enhanced dispersion stability, (c) provide enhanced anti-fogging properties, (d) reduce or eliminate residual filming, and/or (e) reduce or eliminate dust during surface removal. In order to provide such properties, it has been found that less than 5 percent, preferably less than 3 percent, of the total crystalline aluminosilicate particles should have a particle size greater than 5 microns in diameter as determined by sedimentation analysis. Preferably, the crystalline aluminosilicates are airmilled to provide the specific particle size distribution. Certain crystalline aluminosilicates such as Zeolite 4A can be synthesized to provide the specific particle size distributions.

Zeolites A, X, Y and P are conventional materials known in the art. The chemical and physical properties of Zeolites A, X, Y and P are described by Breck, Donald W., *Zeolite Molecular Sieves*, Wiley-Interscience Publication (1974), pp. 67–77, 83–107, 133, 168, 176 and 177, said pages incorporated herein by reference. It has been found that Zeolite 13X having a specific particle size distribution is especially well suited for use as an abrasive in the surface cleaner/polish compositions of this invention.

The crystalline aluminosilicate abrasive materials are generally employed in the surface cleaner/polish compositions of this invention in an amount between about 0.1 weight percent and about 30 weight percent based on the total weight of the composition. Preferably, the crystalline aluminosilicates are employed in an amount of from about 1 weight percent to about 15 weight percent.

The surface cleaner/polish compositions of this invention can contain other ingredients conventionally employed in the art such as waxes, surfactants, thickeners or suspending aids, perfumes and the like. Suitable waxes include vegetable waxes, animal waxes, mineral waxes and synthetic waxes. Suitable surfactants include, for example, nonionic surfactants such as Tergitol NP-9 ® which is an ethoxylated nonylphenol surfactant available from Union Carbide Corporation. Suitable thickeners or suspending aids include, for example, Carbopol 934 ® which is an acrylic acid derived thickener available from the B. F. Goodrich Company. Suitable perfumes include, for example, floral and citrus fragrances. Ammonia can also be included in the surface cleaner/polish compositions of this invention to enhance cleaning properties. The choice of these ingredients and the amount employed is dictated by the nature of the particular surface cleaner/polish composition and the ability of the particular ingredient to perform its intended function.

A preferred surface cleaner/polish composition of this invention contains the following:

| Ingredient | Weight Percent |
|---|---|
| Zeolite 13X | 5.0–15.0 |
| Mineral Spirits | 1.0–10.0 |
| Isopropanol | 5.0–15.0 |
| Tergitol NP-9 ® | 0.10–0.20 |
| Carbopol 934 ® | 0.15–0.20 |
| Perfume | 0.10–0.20 |
| Water | 70.0–80.0 |

The surface cleaner/polish compositions of this invention can be prepared by conventional methods known to those skilled in the art such as by mixing and dispersing the ingredients. However, a particular mixing sequence has been found to provide surface cleaner/polish compositions of this invention having highly preferred properties.

In the preferred mixing sequence, a thickener or suspending aid such as Carbopol 934 ® is dissolved in water with continuous stirring and a crystalline aluminosilicate abrasive material such as Zeolite 4A or Zeolite 13X having a specific particle size distribution is then added and stirred. A monohydroxy alcohol such as isopropanol is added to the resulting mixture after which a mixture containing a monohydroxy alcohol such as isopropanol, a petroleum distillate such as mineral spirits and a surfactant such as Tergitol NP-9 ® is added with continuous stirring. The resulting surface cleaner/polish compositions exhibit highly desired properties as described herein. It has been found that this particular mixing sequence is important for obtaining surface cleaner/polish compositions of this invention.

In comparison with cleaning compositions which contain aluminosilicates having a particle size distribution in which more than 5 percent of the total crystalline aluminosilicate particles have a particle size greater than 5 microns in diameter, the surface cleaner/polish compositions of this invention exhibit enhanced wettability properties, enhanced dispersion stability, enhanced anti-fogging properties, reduction or elimination of residual filming, and reduction or elimination of dust during surface removal. In addition, the surface cleaner/polish compositions contemplated herein provide excellent cleaning properties for both interior and exterior surfaces, especially for weathered surfaces such as glass.

The surface cleaner/polish compositions of this invention have utility as hard surface cleaners, glass cleaners, window cleaners, polishing aids for nonpainted surfaces and the like. Conventional methods can be used for application and removal of the surface cleaner/polish compositions such as by hand or mechanical wiping.

The following examples are provided to further characterize the invention and are not, in any way, meant to be limiting thereof. Crystalline aluminosilicate particle size was determined by sedimentation analysis.

EXAMPLE 1

This experiment illustrates the improved wettability imparted to glass which has been treated with a cleaning composition of this invention. Glass cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |

| Ingredient | Weight Percent |
| --- | --- |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to horizontal glass surfaces and subsequently wiped off. Measured equal drops of water were then applied to the horizontal lass surfaces. The horizontal glass surfaces treated with Formulation A were observed to exhibit enhanced wettability or superior hydrophilic character a larger area on the glass covered by the water) in comparison with the glass surfaces treated with Formulation B.

EXAMPLE 2

This experiment illustrates the improved wettability imparted to glass which has been treated with a cleaning composition of this invention. Glass cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to horizontal glass surfaces and subsequently wiped off. Measured equal drops of water were then applied to the horizontal glass surfaces. The horizontal glass surfaces treated with Formulation a were observed to exhibit enhanced wettability or superior hydrophilic character (a larger area on the glass covered by the water) in comparison with the glass surfaces treated with Formulation B.

EXAMPLE 3

This experiment illustrates the improved wettability imparted to glass which has been treated with a cleaning composition of this invention. Glass cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to horizontal glass surfaces and subsequently wiped off. Measured equal drops of water were then applied to the horizontal glass surfaces. The horizontal glass surfaces treated with Formulation A were observed to exhibit enhanced wettability or superior hydrophilic character (a larger area on the glass covered by the water) in comparison with the glass surfaces treated with Formulation B.

EXAMPLE 4

This experiment illustrates the improved wettability imparted to glass which has been treated with a cleaning composition of this invention. Glass cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to horizontal glass surfaces and subsequently wiped off. Measured equal drops of water were then applied to the horizontal glass surfaces. The horizontal glass surfaces treated with Formulation a were observed to exhibit enhanced wettability or superior hydrophilic character (a larger area on the glass covered by the water) in comparison with the glass surfaces treated with Formulation B.

EXAMPLE 5

This experiment illustrates the improved wettability imparted to glass which has been treated with a cleaning composition of this invention. Glass cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to vertical glass surfaces and subsequently wiped off. Water was then applied to the vertical glass surfaces. The vertical lass surfaces treated with Formulation A were observed to exhibit enhanced wettability or superior hydrophilic character (uniform and complete sheeting of the water on the glass) in comparison with the glass surfaces treated with Formulation B.

EXAMPLE 6

This experiment illustrates the improved wettability imparted to glass which has been treated with a cleaning composition of this invention. Glass cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to vertical glass surfaces and subsequently wiped off. Water was then applied to the vertical glass surfaces. The vertical glass surfaces treated with Formulation A were observed to exhibit enhanced wettability or superior hydrophilic character (uniform and complete sheeting of the water on the glass) in comparison with the glass surfaces treated with Formulation B.

EXAMPLE 7

This experiment illustrates the improved wettability imparted to glass which has been treated with a cleaning composition of this invention. Glass cleaning formulations were prepared containing the following ingredients:

| Ingredient | Weight Percent |
|---|---|
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 weight percent of the total crystalline aluminosilicate particles had a particle size greater than 5 microns in diameter.

These formulations were applied to vertical glass surfaces and subsequently wiped off. Water was then applied to the vertical glass surfaces. The vertical glass surfaces treated with Formulation A were observed to exhibit enhanced wettability or superior hydrophilic character (uniform and complete sheeting of the water on the glass) in comparison with the glass surfaces treated with Formulation B.

EXAMPLE 8

This experiment illustrates the improved wettability imparted to lass which has been treated with a cleaning composition of this invention. Glass cleaning formulations were prepared containing the following ingredients:

| Ingredient | Weight Percent |
|---|---|
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to vertical glass surfaces and subsequently wiped off. Water was then applied to the vertical glass surfaces. The vertical glass surfaces treated with Formulation A were observed to exhibit enhanced wettability or superior hydrophilic character (uniform and complete sheeting of the water on the glass) in comparison with the glass surfaces treated with Formulation B.

EXAMPLE 9

This experiment illustrates the improved dispersion stability exhibited by cleaning compositions of this invention. Cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were allowed to stand for a period of 26 weeks. Multilayer settling including hard settle of the zeolite was observed in Formulation B. Vigorous shaking was required to get the multilayers including the settled zeolite back into solution in Formulation B. None or very little settling was observed in Formulation A and any settled material was easily redispersed with gentle shaking. Formulation A was observed to exhibit enhanced dispersion stability in comparison with Formulation B.

EXAMPLE 10

This experiment illustrates the improved dispersion stability exhibited by cleaning compositions of this invention. Cleaning formulations were -prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were allowed to stand for a period of 26 weeks. Multilayer settling including hard settle of the zeolite was observed in Formulation B. Vigorous shaking was required to get the multilayers including the settled zeolite back into solution in Formulation B. None or very little settling was observed in Formulation A and any settled material was easily redispersed with gentle shaking. Formulation A was observed to exhibit enhanced dispersion stability in comparison with Formulation B.

EXAMPLE 11

This experiment illustrates the improved dispersion stability exhibited by cleaning compositions of this invention. Cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were allowed to stand for a period of 26 weeks. Multilayer settling including hard settle of the zeolite was observed in Formulation B. Vigorous shaking was required to get the multilayers including the settled zeolite back into solution in Formulation B. None or very little settling was observed in Formulation A and any settled material was easily redispersed with gentle shaking. Formulation A was observed to exhibit enhanced dispersion stability in comparison with Formulation B.

EXAMPLE 12

This experiment illustrates the improved dispersion stability exhibited by cleaning compositions of this invention. Cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were allowed to stand for a period of 26 weeks. Multilayer settling including hard settle of the zeolite was observed in Formulation B. Vigorous shaking was required to get the multilayers including the settled zeolite back into solution in Formulation B. None or very little settling was observed in Formulation A and any settled material was easily redispersed with gentle shaking. Formulation A was observed to exhibit enhanced dispersion stability in comparison with Formulation B.

EXAMPLE 13

This experiment illustrates a reduction or elimination of dust during surface removal of dried cleaning compositions of this invention Cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
*Zeolite 4A was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and a reduction in the amount of dust not adhering to the woven or non woven material used to remove the formulation was observed during removal by hand wiping of dried Formulation A from the glass surfaces in comparison with during removal by hand wiping of dried Formulation B from the glass surfaces.

EXAMPLE 14

This experiment illustrates a reduction or elimination of dust during surface removal of dried cleaning compositions of this invention. Cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and a reduction in the amount of dust not adhering to the woven or non-woven material used to remove the formulation was observed during removal by hand wiping of dried Formulation A from the glass surfaces in comparison with during removal by hand wiping of dried Formulation B from the glass surfaces.

EXAMPLE 15

This experiment illustrates a reduction or elimination of dust during surface removal of dried cleaning compositions of this invention. Cleaning formulations were prepared containing the following ingredients:

| Ingredient | Weight Percent |
|---|---|
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and a reduction in the amount of dust not adhering to the woven or non-woven material used to remove the formulation was observed during removal by hand wiping of dried Formulation A from the glass surfaces in comparison with during removal by hand wiping of dried Formulation B from the glass surfaces.

EXAMPLE 16

This experiment illustrates a reduction or elimination of dust during surface removal of dried cleaning compositions of this invention. Cleaning formulations were prepared containing the following ingredients:

| Ingredient | Weight Percent |
|---|---|
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |

-continued

| Ingredient | Weight Percent |
|---|---|
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and a reduction in the amount of dust not adhering to the woven or non-woven material used to remove the formulation was observed during removal by hand wiping of dried Formulation A from the glass surfaces in comparison with during removal by hand of dried Formulation B from the glass surfaces.

EXAMPLE 17

This experiment illustrates a reduction or elimination of residual filming on glass surfaces treated with the cleaning compositions of this invention. Cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and less residual filming was observed after removal by hand wiping of dried Formulation A from the glass surfaces in comparison with the amount of residual filming after removal by hand wiping of dried Formulation B from the glass surfaces. Also, the glass surfaces treated with Formulation A exhibited a smoother feel, e.g., velvety, after cleaning and less dust was observed to be attracted to the glass surfaces treated with Formulation A after cleaning in comparison with the glass surfaces treated with Formulation B after cleaning.

EXAMPLE 18

This experiment illustrates a reduction or elimination of residual filming on glass surfaces treated with the cleaning compositions of this invention. Cleaning formulations were prepared containing the following ingredients:

| Ingredient | Weight Percent |
|---|---|
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and less residual filming was observed after removal by hand wiping of dried Formulation A from the glass surfaces in comparison with the amount of residual filming after removal by hand wiping of dried Formulation B from the glass surfaces. Also, the glass surfaces treated with Formulation A exhibited a smoother feel, e.g., velvety, after cleaning and less dust was observed to be attracted to the glass surfaces treated with Formulation A after cleaning in comparison with the glass surfaces treated with Formulation B after cleaning.

EXAMPLE 19

This experiment illustrates a reduction or elimination of residual filming on glass surfaces treated with the cleaning compositions of this invention. Cleaning formulations were prepared containing the following ingredients:

| Ingredient | Weight Percent |
|---|---|
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and less residual filming was observed after removal by hand wiping of dried Formulation A from the glass surfaces in comparison with the amount of residual filming after removal by hand wiping of dried Formulation B from the glass surfaces. Also, the glass surfaces treated with Formulation A exhibited a smoother feel, e.g., velvety, after cleaning and less dust was observed to be attracted to the glass surfaces treated with Formulation A after cleaning in comparison with the glass surfaces treated with Formulation B after cleaning.

EXAMPLE 20

This experiment illustrates a reduction or elimination of residual filming on glass surfaces treated with the cleaning compositions of this invention. Cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to dirty glass surfaces and subsequently wiped off. The glass surfaces were cleaned effectively, and less residual filming was observed after removal by hand wiping of dried Formulation A from the glass surfaces in comparison with the amount of residual filming after removal by hand wiping of dried Formulation B from the glass surfaces. Also, the glass surfaces treated with Formulation A exhibited a smoother feel, e.g., velvety, after cleaning and less dust was observed to be attracted to the glass surfaces treated with Formulation A after cleaning in comparison with the glass surfaces treated with Formulation B after cleaning.

EXAMPLE 21

This experiment illustrates a reduction or elimination of fogging on glass surfaces treated with the cleaning compositions of this invention. Cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to glass surfaces and subsequently wiped off. The glass surfaces were then subjected to fogging conditions (expired air). Less fogging was observed on glass surfaces treated with Formulation A in comparison with glass surfaces treated with Formulation B. Any adhering fog dissipated more rapidly from glass surfaces treated with Formulation A in comparison with glass surfaces treated with Formulation B.

EXAMPLE 22

This experiment illustrates a reduction or elimination of fogging on glass surfaces treated with the cleaning compositions of this invention. Cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to glass surfaces and subsequently wiped off. The glass surfaces were then subjected to fogging conditions (expired air). Less fogging was observed on glass surfaces treated with Formulation A in comparison with glass surfaces treated with Formulation B. Any adhering fog dissipated more rapidly from glass surfaces treated with Formulation A in comparison with glass surfaces treated with Formulation B.

EXAMPLE 23

This experiment illustrates a reduction or elimination of fogging on glass surfaces treated with the cleaning compositions of this invention. Cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |

| Ingredient | Weight Percent |
| --- | --- |
| Tergitol NP-9 ® | 0.15 |
| Carbopol 934 ® | 0.18 |
| Water | 74.68 |
| Formulation B | |
| Zeolite 13X** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 13X was not airmilled and had a particle size distribution in which greater than 5 percent of the total crystalline aluminosilicate particles had a particle size greater than 5 microns in diameter.

These formulations were applied to glass surfaces and subsequently wiped off. The glass surfaces were then subjected to fogging conditions (expired air). Less fogging was observed on glass surfaces treated with Formulation A in comparison with glass surfaces treated with Formulation B. Any adhering fog dissipated more rapidly from glass surfaces treated with Formulation A in comparison with glass surfaces treated with Formulation B.

EXAMPLE 24

This experiment illustrates a reduction or elimination of fogging on glass surfaces treated with the cleaning compositions of this invention. Cleaning formulations were prepared containing the following ingredients:

| Ingredient | Weight Percent |
| --- | --- |
| Formulation A | |
| Zeolite 4A* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 4A was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were applied to glass surfaces and subsequently wiped off. The glass surfaces were then subjected to fogging conditions (expired air). Less fogging was observed on glass surfaces treated with Formulation A in comparison with glass surfaces treated with Formulation B. Any adhering fog dissipated more rapidly from glass surfaces treated with Formulation A in comparison with glass surfaces treated with Formulation B.

EXAMPLE 46

This experiment illustrates the improved wettability imparted to glass which has been treated with a cleaning composition of this invention. Glass cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were frozen, rethawed, applied to horizontal glass surfaces and subsequently wiped off. Measured equal drops of water were then applied to the horizontal glass surfaces. The horizontal glass surfaces treated with Formulation A were observed to exhibit enhanced wettability or superior hydrophilic character (a larger area on the glass covered by the water) in comparison with the glass surfaces treated with Formulation B. Also, the glass surfaces treated with Formulation A exhibited a smoother feel, e.g., velvety, after cleaning in comparison with the glass surfaces treated with Formulation B after cleaning.

EXAMPLE 26

This experiment illustrates the improved wettability imparted to glass which has been treated with a cleaning composition of this invention. Glass cleaning formulations were prepared containing the following ingredients:

| Ingredient | Weight Percent |
| --- | --- |
| Formulation A | |
| Zeolite 13X* | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |
| Formulation B | |
| Zeolite 4A** | 10.0 |
| Mineral Spirits | 5.0 |
| Isopropanol | 10.0 |
| Tergitol NP-9 ® | 0.15 |
| Carbopol 934 ® | 0.18 |
| Water | 74.68 |

*Zeolite 13X was airmilled to provide a particle size distribution in which less than 5 percent of the total crystalline aluminosilicate particles had a particle size greater than 5 microns in diameter.
**Zeolite 4A was not airmilled and had a particle size distribution in which greater than 5 percent of the total crystalline aluminosilicate particles had a particle size greater than 5 microns in diameter.

These formulations were frozen, rethawed, applied to vertical glass surfaces and subsequently wiped off. Water was then applied to the vertical glass surfaces. The vertical glass surfaces treated with Formulation A were observed to exhibit enhanced wettability or superior hydrophilic character (uniform and complete sheeting of the water on the glass) in comparison with the glass surfaces treated with Formulation B. Also, the glass surfaces treated with Formulation A exhibited a smoother feel, e.g., velvety, after cleaning in comparison with the glass surfaces treated with Formulation B after cleaning.

EXAMPLE 27

This experiment illustrates the particular mixing sequence which is important for obtaining the surface cleaner/polish compositions of this invention.

Procedure I

Into a flask containing 74.53 grams of water was added 0.18 grams of Carbopol 934 ® with continuous stirring until fully dissolved for a period of about one hour. To this solution was added slowly 10.0 grams of Zeolite 13X (less than 5 percent of the total Zeolite 13X particles had a particle size greater than 5 microns in diameter) with continuous stirring. 6.7 grams of isopropanol was then added to the resulting mixture after which a mixture containing 3.3 grams of mineral spirits, 3.3 grams of isopropanol and 0.15 grams of Tergitol NP 9 ® was added with continuous stirring for a period of about 30 minutes. The resulting surface cleaner/polish composition of this invention had a density of 1.038 grams/milliliter.

Procedure II

Into a flask containing 74.53 grams of water was added 0.18 grams of Carbopol 934 ® with continuous stirring until fully dissolved for a period of about one hour. 6.7 grams of isopropanol was then added to the resulting solution after which a mixture containing 3.3 grams of mineral spirits, 3.3 grams of isopropanol and 0.15 grams of Tergitol NP-9 ® added with continuous stirring. To this mixture was added slowly 10.0 grams of Zeolite 13X (less than 5 percent of the total Zeolite 13X particles had a particle size greater than 5 microns in diameter) with continuous stirring for a period of about 30 minutes. The resulting composition had a density of 0.986 grams/milliliter.

The surface cleaner/polish composition of this invention prepared by Procedure I was more uniform in application and exhibited less separation after storage in an oven at a temperature of 120° F. for a period of 2 days in comparison with the composition prepared by Procedure II.

We claim:

1. A surface cleaner/polish composition comprising (i) a monohydroxy alcohol having from 1 to t carbon atoms, (ii) a crystalline aluminosilicate selected from Zeolite A, Zeolite X, Zeolite Y, Zeolite P and mixtures thereof as an abrasive material, (iii) a surfactant and (iv) a thickener or suspending aid, wherein said crystalline aluminosilicate has a particle size distribution in which less than 5 percent of the total crystalline aluminosilicate particles have a particle size greater than 5 microns in diameter, said particle size distribution being sufficient to (a) provide enhanced wettability properties, (b) provide enhanced dispersion stability, (c) provide enhanced anti-fogging properties, (d) reduce or eliminate residual filming, and/or (e) reduce or eliminate dust during surface removal.

2. The surface cleaner/polish composition of claim 1 wherein the monohydroxy alcohol is isopropanol.

3. The surface cleaner polish composition of claim 1 further comprising mineral spirits or petroleum distillates wherein the volatile liquid carrier is a mixture of water, a monohydroxy alcohol having from 1 to 5 carbon atoms and mineral spirits.

* * * * *